US009132547B2

(12) United States Patent
Jang et al.

(10) Patent No.: US 9,132,547 B2
(45) Date of Patent: Sep. 15, 2015

(54) ROBOT AND METHOD TO RECOGNIZE AND HANDLE ABNORMAL SITUATIONS

(71) Applicant: Samsung Electronics Co., Ltd., Suwon-si (KR)

(72) Inventors: Jun Won Jang, Yongin-si (KR); Kyung Shik Roh, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 151 days.

(21) Appl. No.: 13/738,485

(22) Filed: Jan. 10, 2013

(65) Prior Publication Data

US 2013/0184867 A1    Jul. 18, 2013

(30) Foreign Application Priority Data

Jan. 12, 2012  (KR) .................. 10-2012-0003641

(51) Int. Cl.
   *B25J 9/16*   (2006.01)
(52) U.S. Cl.
   CPC ............... *B25J 9/163* (2013.01); *B25J 9/1674* (2013.01); *G05B 2219/33002* (2013.01); *G05B 2219/33056* (2013.01); *G05B 2219/45108* (2013.01)
(58) Field of Classification Search
   CPC ....... G05D 1/0221; G06N 3/008; G06N 5/04; B25J 9/0003; B25J 9/163; B25J 9/16; B25J 9/1674; Y10S 901/01; G05B 2219/45108; G05B 2219/33056; G05B 2219/33032
   USPC .............. 700/246, 250, 252–254, 257; 901/1
   See application file for complete search history.

(56) References Cited

U.S. PATENT DOCUMENTS

| 6,522,949 | B1* | 2/2003 | Ikeda et al. ................... 700/245 |
| 8,271,131 | B2* | 9/2012 | Kato et al. .................... 700/246 |
| 8,484,146 | B2* | 7/2013 | Movellan et al. ............... 706/45 |
| 2004/0133453 | A1* | 7/2004 | Jomini et al. ..................... 705/2 |
| 2006/0184491 | A1* | 8/2006 | Gupta et al. .................... 706/47 |
| 2006/0195409 | A1* | 8/2006 | Sabe et al. ....................... 706/16 |
| 2007/0027579 | A1* | 2/2007 | Suzuki et al. ................. 700/245 |
| 2007/0162410 | A1* | 7/2007 | Hinchey et al. ................ 706/48 |
| 2007/0198444 | A1* | 8/2007 | Movellan et al. ............... 706/12 |
| 2009/0177323 | A1* | 7/2009 | Ziegler et al. ................. 700/259 |
| 2010/0222925 | A1* | 9/2010 | Anezaki ........................ 700/253 |
| 2011/0208354 | A1* | 8/2011 | Kato et al. .................... 700/246 |

FOREIGN PATENT DOCUMENTS

| JP | 2007-115275 | 5/2007 |
| KR | 10-2009-0113787 | 11/2009 |
| KR | 10-2010-0086262 | 7/2010 |

* cited by examiner

*Primary Examiner* — Jason Holloway
(74) *Attorney, Agent, or Firm* — Harness, Dickey & Pierce, PLC.

(57) ABSTRACT

A robot and method to recognize and handle abnormal situations includes a sensing unit to sense internal and external information of the robot, a storage unit to store the information sensed by the sensing unit, an inference model, a learning model, services providable by the robot, subtasks to provide the services, and handling tasks to handle abnormal situations, and a controller to determine whether an abnormal situation has occurred while the subtasks to provide the selected service are being performed through the learning model in the storage unit and to select a handling task to handle the abnormal situation through the inference model in the storage unit if it is determined that the abnormal situation has occurred. The robot may recognize and handle abnormal situations even though data other than that defined by a designer of the robot is input thereto due to noises or operational environment.

16 Claims, 4 Drawing Sheets

ROBOT AND METHOD TO RECOGNIZE AND HANDLE ABNORMAL SITUATIONS

CROSS-REFERENCE TO RELATED APPLICATIONS

This application claims the priority benefit of Korean Patent Application No. 10-2012-0003641, filed on Jan. 12, 2012 in the Korean Intellectual Property Office, the disclosure of which is incorporated herein by reference.

BACKGROUND

1. Field

The following description relates to a robot and a method which recognizes and handles abnormal situations, exceptional situations, or erroneous situations (hereinafter collectively referred to as abnormal situations) which may occur while the robot is providing services.

2. Description of the Related Art

Robots installed in homes, unlike those installed in industrial sites which handle a given task in the same manner, are required to provide services in a variety of operational situations and to flexibly handle the situations which may occur due to uncertainty of operational situations while providing services.

Nonetheless, in the related art, when unpredicted information is input to a robot or exceptional situations unpredicted by a designer occur due to uncertainty of operational situations, the robot recognizes them as input errors or merely defines that exceptional situations occur, but may not recognize and handle such situations appropriately.

In this connection, a robot has been proposed which configures a hierarchical data structure using data input by a sensing unit of the robot, enhances recognition capability for environmental situation of the robot using the hierarchical data structure, and determines future situations so that the robot may handle unpredicted situations appropriately.

However, if the situation determined by the robot and the situation actually recognized do not match, the robot continues to explore the surroundings until the determined data is input thereto or merely ignores such a situation. Therefore, the robot in the related art may not handle abnormal situations appropriately.

SUMMARY

Therefore, it is an aspect of the present disclosure to provide a robot and a method to recognize whether an abnormal situation has occurred based on input data other than that predefined by a designer of the robot, due to noise or uncertainty of operational situations, and to perform a handling task to handle the abnormal situation.

Additional aspects of the invention will be set forth in part in the description which follows and, in part, will be obvious from the description, or may be learned by practice of the invention.

In accordance with an aspect of the present disclosure, a robot includes a sensing unit to sense internal and external information of the robot, a storage unit to store the information sensed by the sensing unit, an inference model, a learning model, services providable by the robot, subtasks to provide the services, and handling tasks to handle abnormal situations, and a controller to select a service to be provided by the robot according to a user command or through the inference model in the storage unit, to determine whether an abnormal situation has occurred while the subtasks to provide the selected service are being performed through the learning model in the storage unit, and to select a handling task to handle the abnormal situation through the inference model in the storage unit if it is determined that the abnormal situation has occurred.

With respect to selecting a service to be provided by the robot, the controller may determine whether a service to be provided by the robot is selected, retrieve the information, the inference model, and the services providable by the robot in the storage unit to the controller if the service to be provided by the robot is not selected, and determine whether the information satisfies rules included in the inference model to select the service to be provided by the robot.

With respect to determining whether an abnormal situation has occurred, the controller may select subtasks to provide the selected service, determine whether a learning model corresponding to the subtasks is in the storage unit, retrieve the information and the learning model in the storage unit to the controller if there is a learning model corresponding to the subtasks in the storage, input the information to the learning model, and determine whether an abnormal situation has occurred based on a result from the learning model.

The controller may retrieve the information in the storage unit if there is no learning model corresponding to the subtasks in the storage unit, train a learning model by mapping the information to occurrence/non-occurrence of abnormal situations, and store the trained learning model to the storage unit, to thereby create a learning model corresponding to the subtasks.

With respect to selecting a handling task to handle an abnormal situation, the controller may retrieve the information in the storage unit, the inference model, and the handling tasks to handle abnormal situations to the controller, and determine whether the information satisfies rules included in the inference model, to select the handling tasks to handle the abnormal situation.

In accordance with an aspect of the present disclosure, a method to recognize and handle abnormal situations in a robot includes selecting a service to be provided by the robot according to a user command or through an inference model in a storage unit of the robot, determining whether an abnormal situation has occurred while the subtasks to provide the selected service are being performed through the learning model in the storage unit, and selecting a handling task to handle the abnormal situation through the inference model in the storage unit if it is determined that the abnormal situation has occurred.

The selecting may include determining whether a service to be provided by the robot is selected, retrieving the information, the inference model, and the services providable by the robot in the storage unit to the controller if a service to be provided by the robot is not selected, and determining whether the information satisfies rules included in the inference model to select a service to be provided by the robot.

The determining whether an abnormal situation has occurred may include electing the subtasks to provide the selected service, determining whether a learning model corresponding to the subtasks is in the storage, retrieving the information and a learning model in the storage unit if there is a learning model corresponding to the subtasks in the storage and inputting the information to the learning model, and determining whether an abnormal situation has occurred based on a result from the learning model.

The determining whether an abnormal situation has occurred may further include retrieving the information in the storage unit if no learning model in the storage unit corresponds to the subtasks, training a learning model by mapping the information to occurrence/non-occurrence of abnormal situations, and storing the trained learning model in the storage unit to create a learning model corresponding to the subtasks.

The selecting handling tasks may include retrieving the information in the storage unit, the inference model, and the handling tasks to handle abnormal situations to the controller, and determining whether the information satisfies rules included in the inference model to select a handling task to handle the abnormal situation.

In accordance with an aspect of the present disclosure, a method for processing an error that occurs during an operation of a robot may include identifying, by a processor, the error, performing a search for a subtask in the robot to process the identified error, selectively performing a training operation if a subtask is not found by the search, and creating a subtask to process the identified error using the training operation, and processing the identified error using the subtask to allow continued operation of the robot.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

Figure 1:
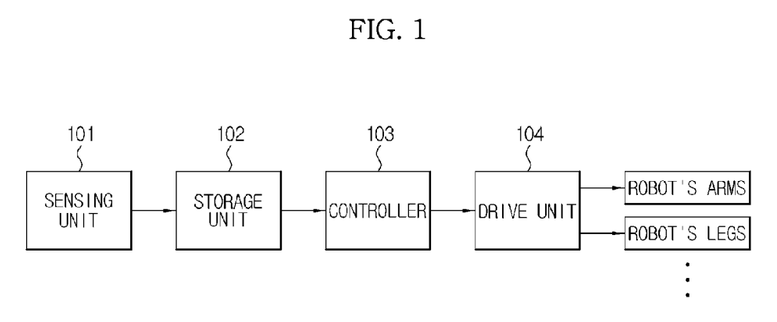
FIG. 1 is a block diagram schematically illustrating a configuration of a robot to recognize and handle abnormal situations according to an embodiment of the present disclosure.
Figure 2:
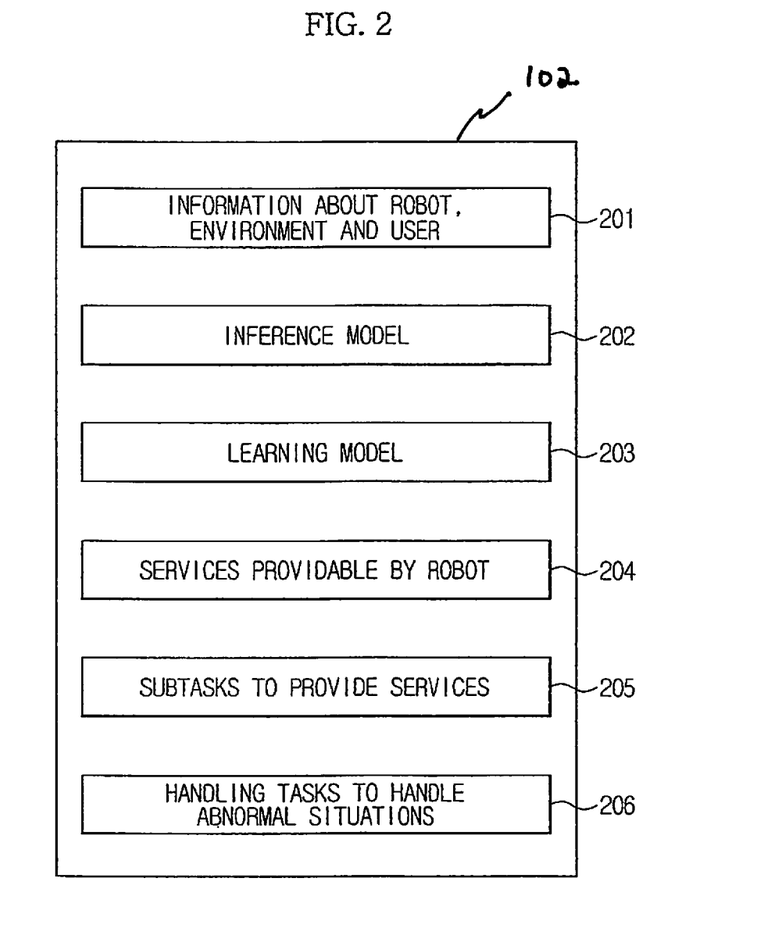
FIG. 2 is a block diagram illustrating contents stored in a storage unit of the robot according to the embodiment of the present disclosure.
Figure 3:
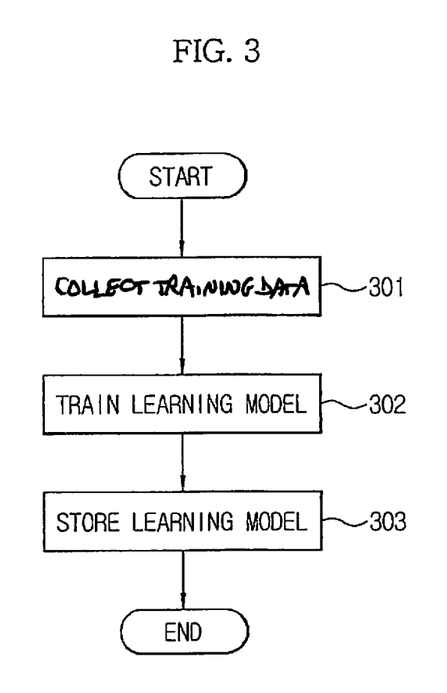
FIG. 3 is a flowchart illustrating a method to create a learning model according to the embodiment of the present disclosure.

FIG. 1 is a block diagram schematically illustrating a configuration of a robot to recognize and handle abnormal situations according to an embodiment of the present disclosure, FIG. 2 is a block diagram illustrating contents stored in a storage unit of the robot according to the embodiment of the present disclosure, and FIG. 3 is a flowchart illustrating a method to create a learning model according to the embodiment of the present disclosure.

Referring to FIGS. 1 and 2, a robot according to an embodiment of the present disclosure includes a sensing unit 101 to sense internal and external information of the robot, a storage unit 102 to store the information sensed by the sensing unit 101, an inference model 202, a learning model 203, services 204 providable by the robot, subtasks 205 to provide the services, and handling tasks 206 to handle abnormal situations, a controller 103 to select a service to be provided by the robot, to determine whether an abnormal situation has occurred while subtasks to provide the service are being performed, and, if it is determined that the abnormal situation has occurred, to select a coping task for the abnormal situation, a drive unit 104 to drive the robot in order to provide the services selected by the controller 103, and arms and legs of the robot to fulfill the subtasks or handling tasks by the controller and the like. However, the disclosure is not limited to the above-described embodiment. For example, the sensing unit or storage unit may be provided externally to the robot.

The sensor 101 includes a plurality of sensors arranged in the robot.

Sensors to sense internal information of the robot such as an acceleration sensor to sense a torque of a motor provided on a joint of the robot, an inertia sensor to sense a location of the robot, speed, acceleration, etc., an inclination sensor to sense inclination degree, or a gyro sensor, and sensors to sense an outside, or external, environment of the robot or sensors to sense user information such as a vision sensor to sense visual information, an audio sensor to sense auditory information, a tactile sensor to sense tactile information, an ultrasonic sensor to sense distance to an object, a temperature sensor to sense temperature, or a humidity sensor to sense humidity may be included, for example.

The storage unit 102 stores information 201 about the robot, the environment and the user sensed by the sensing unit 101, the inference model 202, the learning model 203, the services 204 providable by the robot, the subtasks 205 to provide the services, and the handling tasks 206 to handle abnormal situations.

The information 201 about the robot, the environment, and the user includes robot information, robot outside environment information, and user information.

The robot information includes a torque value of a motor provided on a joint of the robot sensed by the acceleration sensor of the robot, location, speed, and acceleration values of the robot sensed by the inertia sensor, for example. The robot outside environment information includes visual information sensed by a vision sensor, temperature sensed by the temperature sensor, humidity sensed by the humidity sensor, as well as information indicating whether an object is broken or whether a floor is dirty, generated by processing visual information or auditory information. The user information includes visual information sensed by the vision sensor, auditory information sensed by the audio sensor, as well as information indicating whether the user is thirty or hungry, generated by processing the visual information or auditory information.

For example, when a user says "I am thirsty," the audio sensor of the sensing unit 101 of the robot senses the user's voice, and information indicating that the user is thirsty is stored in the storage unit 102.

The services 204 providable by the robot include all kinds of services the robot may provide as appropriate for its purpose, such as delivering beverages, preparing meals, or cleaning, for example.

The services 204 providable by the robot consist of subtask 205 to provide services, and the subtasks 205 are stored in the storage unit 102 in a predetermined order in association with the services 204 providable by the robot.

The subtasks 205 to provide services refer to respective actions the robot performs to provide services, such as a task of lifting a certain object, a task of moving to a certain place, or a task of notifying a user of certain information, for example.

The services 204 providable by the robot are fulfilled by performing the subtasks 205 to provide services in an order. For example, a service of delivering a beverage to a user specifically includes a task of searching for a beverage, a task of picking up the beverage, a task of moving to the user while carrying the beverage, and a task of passing the beverage to the user, and the tasks need to be performed in a predetermined order, to complete the service of delivering the beverage to the user.

An abnormal situation refers to a situation in which a robot which is performing one of the subtasks to provide a service may not be able to perform the next subtask. For example, in a situation in which a robot which is performing a task of searching for a beverage in order to provide a beverage delivery service may not be able to find the beverage, and a situation in which a robot which is performing a task of moving to a user while carrying a beverage drops a cup containing the beverage.

The handling tasks 206 to handle abnormal situations refer to respective actions which are performed by a robot to handle abnormal situations upon recognizing the abnormal situations. Examples of the handling tasks 206 includes a task to notify a user of information indicating that no beverage is found in the situation in which the robot may not be able to find a beverage in performing the task of searching for a beverage, and a task to pick up a cup containing a beverage in the situation in which the robot drops the cup containing the beverage in performing the task of moving to a user while carrying the beverage.

The inference model 202 is used to deduce new information using several propositions (including facts and rules), examples of which include a First Order Logic (FOL) and a Bayesian Network.

The inference model 202 stored in storage unit 102 include rules related to selection of a service to be provided by a robot and selection of a handling task to handle an abnormal situation.

For example, the inference model 202 stored in the storage unit 102 may include a rule that "if a user is thirsty, deliver a beverage," a rule that "if a user is busy and a floor is dirty, clean the floor," a rule that "if a user is hungry, prepare a meal," a rule that "if there is an unbroken object, pick it up," and a rule that "if an object is broken and a user is not busy, notify the user."

The learning model 203 is a kind of a mapping function to calculate output data for input data, an example of which includes Support Vector Machine (SVM). Upon receiving input data, the learning model outputs output data corresponding to the input data.

Basically, the learning model 203 is predefined by a designer of a robot and stored in the storage unit 102. However, in a case that no learning model corresponding to a service provided by a robot is in the storage unit 102, the controller 103 retrieves information 201 related to generation of a learning model from the storage unit 102 to create a learning model.

The generation of a learning model relates to a series of processes to infer a learning model from training data which includes input data and corresponding output data.

Referring to FIG. 3, the specific processes of generating the learning model 203 by the controller 103 includes operation 301 of collecting training data related to a learning model by the controller 103, operation 302 of training the learning model by mapping input data to output data among the training data by the controller 103, and operation 303 of storing the trained learning model in the storage unit 102 by the controller 103.

The training data includes information related to abnormal situations which may occur while subtasks to provide a selected service are being performed and occurrence/non-occurrence of abnormal situations.

An example will be described, in which the controller 103 creates a learning model determining whether a robot is grasping an object by receiving torque values of joints of the robot's hand so that an abnormal situation is determined through the learning model.

Specifically, assuming that the robot's hands are designed to have twenty-two joints, nine joints included in a thumb, a forefinger, and a middle finger have a main role to grasp an object, nine torque values of which may be defined as a ninth order vector.

When the robot is grasping an object, the controller 103 measures the nine torque values several times in real-time, and stores the nine torque values as input data and (+1) as output data at respective measurement timings. Further, when the robot drops the object, the controller 103 measures the nine torque values several times in real-time, and stores at respective measurement timings the nine torque values as input data and (−1) as output data. However, the output data is not limited to the above values, and other values may be output as appropriate.

The controller 103 may create a learning model by mapping the input data, i.e., the nine torque values, to the output data.

While the robot is performing subtasks to provide services, when the sensing unit 101 measures the nine torque values of the joints included in the thumb, the forefinger, and the middle finger of the robot in real-time and the controller 103 inputs the nine torque values to the created learning model, the learning model outputs (+1) or (−1). Further, the controller 103 may determine whether the robot has dropped the object through the output of the learning model.

The controller 103 selects a service to be provided by the robot through the inference model 202 in the storage unit 102, determines whether abnormal situations occur in performing subtasks to provide the selected service through the learning model 203 in the storage unit 102, and, if it is determined that an abnormal situation has occurred, selects a task to handle the abnormal situation through the inference model 202 in the storage unit 102.

With regard to selecting a service to be provided by the robot, the controller 103 determines whether the service to be provided by the robot is selected. If a service to be provided by the robot is not selected, the controller 103 retrieves the information 201 about the surroundings of the robot and the user, the inference model 202, and the services 204 providable by the robot from the storage unit 102, and selects a service to be provided by the robot through the retrieved information 201 and the inference model 202.

Specifically, the controller 103 determines whether the information 201 in the storage unit 102 satisfies the rules included in the inference model 202 for each of the services providable by the robot to select a service to be provided by the robot.

For example, it is assumed that information that "user 1 is thirsty," information that "user 1 is busy," information that "user 2 is busy," and information that "living room is clean" are stored in the storage unit 102, that an inference model including a rule that "if a user is thirsty, deliver a beverage," a rule that "if a user is busy and a floor is dirty, clean the floor," and a rule that "if a user is hungry, prepare a meal" are stored in the storage unit 102, and that a beverage delivering service, a meal preparing service, and a cleaning service are stored in the storage unit 102.

The controller 103 retrieves the information, the inference model, and the services providable by the robot from the storage unit 102. Then, the controller 103 determines whether the retrieved information satisfies the rules of the inference model. Specifically, the controller 103 infers from the information that "user 1 is thirsty" that a beverage is to be delivered to user 1, and the controller 103 selects the beverage delivering service to user 1 as a service to be provided by the robot. In a similar manner, because user 1 and user 2 are not hungry, the controller 103 does not select the meal preparing service, and because the living room is clean, the controller 103 does not select the cleaning service.

The controller 103 selects subtasks to be performed by the robot in a predetermined order from among a plurality of tasks 205 corresponding to the selected service. Further, the controller 103 determines whether a learning model corresponding to the selected subtasks is in the storage unit 102, and if it is determined that a learning model corresponding to the selected subtasks is in the storage unit 102, the controller 103 retrieves the learning model corresponding to the selected subtasks from the storage unit 102. If it is determined that no learning model in the storage unit 102 corresponds to the selected tasks, the controller 103 retrieves the information 201 from the storage unit 102, and creates a learning model corresponding to the selected subtasks.

The controller 103 retrieves subtasks to provide the selected service from the storage unit 102, and controls the drive unit 104 according to the subtasks. For example, the beverage delivering service may include a task of searching for a beverage, a task of picking up the beverage, a task of moving to a user while carrying the beverage, and a task of passing the beverage to the user, and the controller 103 retrieves the task of searching for a beverage, and controls the drive unit 104 according to the task of searching for a beverage. If a beverage is found, the task of searching for a beverage is completed, and the controller 103 retrieves the task of picking up the beverage from the storage unit 102, to control the drive unit 104 accordingly. In a similar manner, the controller 103 controls the drive unit such that the robot performs all of the subtasks included in the beverage providing service in order.

The drive unit 104 fulfills a selected service by driving the robot's arms, legs, and the like according to a control signal from the controller 103.

In performing selected subtasks, the controller 103 retrieves the information 201 corresponding to an input to the learning model 203 from the storage unit 102, inputs the retrieved information 201 to the learning model 203, and determines whether abnormal situations occur based on the result.

For example, it is assumed that a learning model 203 is stored that outputs (+1) when the robot is grasping a cup, and outputs (−1) when the robot drops the cup upon receiving nine torque values of the robot's hands.

While the robot is performing the task of moving to a user while carrying an object, the controller 103 retrieves nine torque values and the learning model 203 in the information 102 in the storage unit 102, and inputs the nine torque values to the learning model 203. By doing so, the controller 103 may determine that the robot is grasping the object and thus no abnormal situation has occurred if the output from the learning model is (+1), whereas the controller 103 may determine that the robot has dropped the object and thus an abnormal situation has occurred if the output from the learning model is (−1).

If an abnormal situation has occurred, the controller 103 retrieves the information 201 about the surroundings of the robot and a user, the inference model 202, and tasks 206 to handle abnormal situations from the storage unit 102, determines whether the retrieved information 201 satisfies the rules included in the inference model 202, and selects a handling task to handle the abnormal situations.

For example, if an abnormal situation has occurred where the robot drops an object while performing a task of delivering the object to a user and the user is busy, then information that "the object is broken," information that "the floor is dirty," and information that "the user is busy" are stored in the storage unit 102. Further, it is assumed that the inference model 202 is stored in the storage unit 102 including a rule that "if a user is busy and a floor is dirty, clean the floor," a rule that "if there is unbroken object, pick it up," and a rule that "if there is a broken object and a user is not busy, notify the user," and that a task of notifying a user, a task of picking up an object, and a task of cleaning a floor are stored as a handling task to handle an abnormal situation.

The controller 103 retrieves the information, the inference model, and the handling tasks to handle abnormal situations, determines whether the retrieved information satisfies the rules of the inference model, and selects a handling task to handle the abnormal situation.

Because the object is broken, the controller 103 does not select the task of picking up an object. Because the user is busy, the controller 103 does not select the task of notifying a user. Because the user is busy and the floor is dirty, the controller 103 selects the task of cleaning the floor.

The controller 103 controls the drive unit 104 according to the task of cleaning the floor, and the robot's arms and legs fulfill the task of cleaning the floor.

Figure 4:
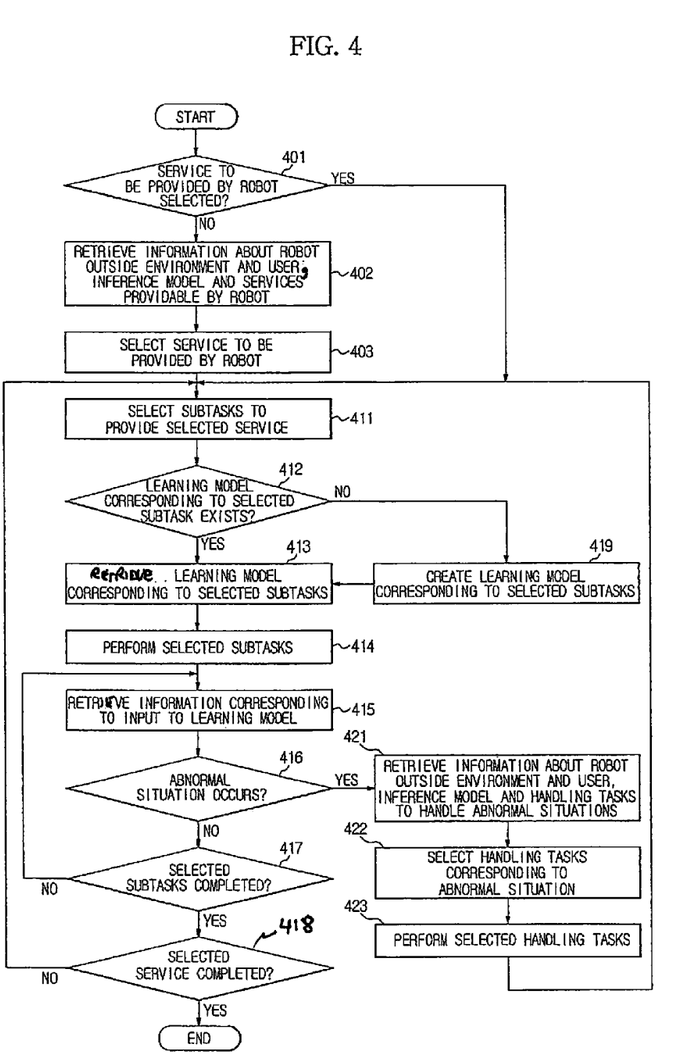
FIG. 4 is a flowchart illustrating a method to recognize abnormal situations and select handling tasks, performed by the robot according to the embodiment of the present disclosure.

FIG. 4 is a flowchart illustrating a method to determine whether abnormal situations occur and to select handling tasks by the robot according to the embodiment of the present disclosure. According to the embodiment of the present disclosure, the operations to determine abnormal situations and to select handling tasks by the controller 103 will be described with reference to FIG. 4.

The controller 103 determines whether a service to be provided by the robot is selected (401). If a service to be provided by the robot is selected, the controller 103 does not select a service to be provided by the robot but selects subtasks to provide the selected service (411).

If a service to be provided by the robot is not selected, the information about the surroundings of the robot and a user and the inference model are retrieved from the storage unit 102 (402). Then, the controller 103 determines whether the information in the storage unit 102 satisfies the rules included in the inference model, to select a service to be provided by the robot (403).

If a service to be provided by the robot is selected, the controller 103 selects subtasks to provide the selected service (411). The subtasks to provide the selected service are stored in a predetermined order to provide the service, and the controller 103 selects the subtasks in the predetermined order (411).

If subtasks to be performed by the robot are selected, the controller 103 determines whether a learning model corresponding to the selected subtasks is in the storage unit 102 (412).

If no learning model corresponds to the selected subtasks, the controller 103 creates a learning model corresponding to the selected subtasks through operation 301 of collecting training data, operation 302 of training a learning model using the training data, and operation 303 of storing the trained learning model in the storage unit 102 (419).

If there is a learning model corresponding to the selected subtasks in the storage unit 102, the controller 103 retrieves the learning model corresponding to the selected subtasks from the storage unit 102 (413).

Then, the controller 103 retrieves the selected subtasks from the storage unit 102, and controls the drive unit 104 of the robot according to the retrieved subtasks such that the robot performs the selected subtasks (414).

While the selected subtasks are being performed, the controller 103 retrieves the information corresponding to an input to the learning model from the storage unit 102 (415), inputs the retrieved information to the learning model, and determines whether abnormal situations occur based on output from the learning model (416).

If it is determined that no abnormal situation has occurred, the controller 103 determines whether the selected subtasks are completed (417).

If the selected subtasks are not completed, the controller 103 repeats the processes of retrieving the information corresponding to an input to the learning model from the storage unit 102 in real-time (415), and inputting the retrieved information to the learning model and determining whether abnormal situations occur based on output from the learning model (416). That is, the controller 103 retrieves the information in the storage unit 102, inputs the same to the learning model, and monitors whether abnormal situations occur based on the output, until the selected subtasks are completed.

If the selected subtasks are completed, the controller 103 determines whether the service provided by the robot is completed (418).

If the service provided by the robot is not completed, the controller 103 selects the next subtask to provide the service (411). If the service provided by the robot is completed, the controller 103 stands by to select a next service.

If it is determined that an abnormal situation has occurred, the controller 103 retrieves the information about the surroundings of the robot and a user, the inference model, and handling tasks to handle abnormal situations from the storage unit 102 (421).

The controller 103 determines whether the information in the storage unit 102 satisfies the rules included in the inference model, to select a handling task to handle the abnormal situation (422).

Then, the controller 103 controls the drive unit 104 of the robot according to the selected handling task such that the robot performs the selected handling task (423).

When the handling task to handle the abnormal situation is completed, the controller 103 again selects subtasks to provide the selected service (411), and performs the subtasks in an order, to complete providing the selected service.

As is apparent from the above description, by determining whether an abnormal situation has occurred using a learning model and selecting a handling task to handle the abnormal situation using an inference model, even though input data other than predefined data (unseen input) is input thereto due to noise or uncertainty of operational situations of a robot, the learning model does not recognize it as an input error, but may output data corresponding thereto, and, based on the output data, a controller of the robot may determine whether an abnormal situation has occurred. Further, the controller may select a handling task to handle the abnormal situation and cause the robot to perform the handling task.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A robot, comprising:
   a sensing unit configured to sense information of the robot;
   a storage unit configured to store the information sensed by the sensing unit, at least one inference model, at least one learning model, at least one service providable by the robot, at least one subtask to provide the at least one service, and at least one handling task to handle an abnormal situation of the robot; and
   a controller configured to select a service to be provided by the robot from among the at least one service providable by the robot by using the at least one inference model, configured to select a subtask to provide the selected service from among the at least one subtask, and configured to determine whether the abnormal situation has occurred while the selected subtask is being performed by using the at least one learning model;
   wherein the abnormal situation is a situation in which the robot, which is performing the selected subtask to provide the selected service, is unable to perform a next subtask.

2. The robot according to claim 1, wherein the controller is further configured to determine whether the service to be provided by the robot is selected, and is further configured to determine whether the information satisfies rules included in the at least one inference model in order to select the service to be provided by the robot, if the service to be provided by the robot is not selected.

3. The robot according to claim 1, wherein the controller is further configured to select a learning model corresponding to the selected subtask from among the at least one learning model, is further configured to input the information to the selected learning model, and is further configured to determine whether the abnormal situation has occurred based on an output from the selected learning model.

4. The robot according to claim 3, wherein the controller is further configured to train the selected learning model by mapping the information to occurrence/non-occurrence of abnormal situations if there is no learning model corresponding to the selected subtask in the storage unit, and is further configured to store the trained learning model in the storage unit, in order to thereby create a learning model corresponding to the selected subtask.

5. The robot according to claim 1, wherein the controller is further configured to select a handling task from the at least one handling task to handle the abnormal situation by using the at least one inference model if it is determined that the abnormal situation has occurred.

6. The robot according to claim 5, wherein the controller is further configured to determine whether the information satisfies rules included in the at least one inference model in order to select the handling task from the at least one handling task to handle the abnormal situation.

7. A method, comprising:
sensing, by a sensor, information of a robot;
selecting, by a processor, a service to be provided by the robot by using an inference model stored by the robot;
selecting, by the processor, a subtask to provide the selected service; and
determining, by the processor, by using a learning model stored by the robot, whether an abnormal situation of the robot has occurred while the selected subtask is being performed;
wherein at least one handling task of the robot is configured to handle the abnormal situation, and
wherein the abnormal situation is a situation in which the robot, which is performing the selected subtask to provide the selected service, is unable to perform a next subtask.

8. The method according to claim 7, wherein the selecting of the service comprises:
determining whether the service is selected; and
determining whether the information satisfies rules included in the inference model in order to select the service, if the service to be provided by the robot is not selected.

9. The method according to claim 7, wherein the determining of whether the abnormal situation has occurred comprises:
selecting the learning model corresponding to the selected subtask;
inputting the information to the selected learning model; and
determining whether the abnormal situation has occurred based on an output from the selected learning model.

10. The method according to claim 9, wherein the determining of whether the abnormal situation has occurred further comprises:
training the selected learning model by mapping the information to occurrence/non-occurrence of abnormal situations if no learning model corresponds to the selected subtask; and
storing the trained learning model in order to create a learning model corresponding to the selected subtask.

11. The method according to claim 7, further comprising:
selecting the at least one handling task to handle the abnormal situation by using the inference model if it is determined that the abnormal situation has occurred.

12. The method according to claim 11, wherein the selecting of the at least one handling task comprises:
determining whether the information satisfies rules included in the inference model in order to select the at least one handling task.

13. The robot according to claim 1, wherein the information sensed by the sensing unit comprises internal and external information of the robot.

14. The robot according to claim 1, further comprising:
a drive unit configured to drive the robot in order to provide the service selected by the controller.

15. The method according to claim 7, further comprising:
driving the robot in order to provide the selected service.

16. A non-transitory computer-readable recording medium storing a program to implement a method, the method comprising:
sensing, by a sensor, information of a robot;
selecting, by a processor, a service to be provided by the robot by using an inference model stored by the robot;
selecting, by the processor, a subtask to provide the selected service; and
determining, by the processor, by using a learning model stored by the robot, whether an abnormal situation of the robot has occurred while the selected subtask is being performed;
wherein at least one handling task of the robot is configured to handle the abnormal situation, and
wherein the abnormal situation is a situation in which the robot, which is performing the selected subtask to provide the selected service, is unable to perform a next subtask.

* * * * *